(12) United States Patent
Deitert

(10) Patent No.: US 7,402,005 B2
(45) Date of Patent: Jul. 22, 2008

(54) CUTTING TIP FOR A MILLING CUTTER

(75) Inventor: Heinz Deitert, Herzebrock-Clarholz (DE)

(73) Assignee: Depo GmbH & Co. KG (DE)

( * ) Notice: Subject to any disclaimer, the term of this patent is extended or adjusted under 35 U.S.C. 154(b) by 0 days.

(21) Appl. No.: 10/569,119

(22) PCT Filed: Aug. 18, 2004

(86) PCT No.: PCT/EP2004/009245

§ 371 (c)(1),
(2), (4) Date: Nov. 3, 2006

(87) PCT Pub. No.: WO2005/021196

PCT Pub. Date: Mar. 10, 2005

(65) Prior Publication Data

US 2007/0059111 A1    Mar. 15, 2007

(30) Foreign Application Priority Data

Aug. 23, 2003   (DE) ................................ 103 38 784

(51) Int. Cl.
*B23B 27/00* (2006.01)
*B27B 27/02* (2006.01)

(52) U.S. Cl. ........................ 407/113; 407/114; 407/116; 407/66

(58) Field of Classification Search ................. 407/113, 407/114, 116, 117, 119, 66, 67
See application file for complete search history.

(56) References Cited

U.S. PATENT DOCUMENTS 5,078,550 A * 1/1992 Satran et al. ................... 407/34
6,193,446 B1 * 2/2001 Astrom et al. .............. 407/114
6,257,807 B1 * 7/2001 Heinloth ..................... 407/113
6,413,023 B1   7/2002 Nagashima
6,503,028 B1 * 1/2003 Wallstrom ................... 407/35

FOREIGN PATENT DOCUMENTS

JP    2003181714 A    7/2003
JP         181714     11/2003

OTHER PUBLICATIONS

International Search Report, Nov. 17, 2005, European Patent Office.
International Preliminary Examination Report for Application No. PCT/EP2004/009245, dated Mar. 9, 2006.
International Preliminary Report on Patentabilty for Application No. PCT/EP2004/009245, dated Jul. 10, 2006.

* cited by examiner

Primary Examiner—Willmon Fridie
(74) Attorney, Agent, or Firm—Bourque and Associates

(57) ABSTRACT

A cutting tip for automatic milling has the basic form of a parallelogram along whose longitudinal sides (1) straight cutting edges are constructed. Radius cutting edges which are located on the parallelogram transverse edges with the smaller corner angles are attached to it and run into edges which end in the area of the parallelogram transverse sides. In order to also use the transverse sides of the parallelogram type basic form for milling processes, cutting edges are arranged on the parallelogram transverse sides whereby at least one curvature radius (3) is substantially larger then the curvature radius of the radius cutting edges (2). Between these lesser curved cutting edges (3) and the radius cutting edges (2) there is an edge area (4) with a concave curvature.

3 Claims, 1 Drawing Sheet

CUTTING TIP FOR A MILLING CUTTER

TECHNICAL FIELD

The invention pertains to a cutting tip for a milling cutter.

BACKGROUND INFORMATION

Cutting tips of the aforementioned type are well known from, for example, U.S. Pat. No. 6,413,023 B1. Such cutting tips are detachably affixed to the tool holder of the milling cutter. Thus they are replaceable and also turnable in order to selectively use one of the straight cutting edges which are provided for different milling work.

The application of one of the straight long sided cutting edges requires an alignment of the cutting edge on the cutting mill in which the cutting edges which are parallel to each other lie parallel to the rotation axle. This corresponds to the so called vertical position of the cutting tip with which it is possible to work on a work piece wall which has been aligned parallel to the straight cutting edges. In order to process a work piece with one of the curved cutting edges, the cutting edge will be transferred from the vertical position into a sloping position in order to either let the radius cutting edge or the weaker curved cutting edge on the respective parallelogram transverse side of the cutting edge enter the work piece gear.

Because of the relative small geometry of the radius cutting edges, they alone are used to implement an easier chip removal in the respective inclined operating position of the cutting edges, whereby usually a finishing process is applied with the radius cutting edges. By a respective stronger inclined position of the cutting tip, the additional cutting edge with the weaker curve positioned on the transverse side will be transferred to the work piece gear so that it can process a work piece surface which extends vertically to the cutting mill through rough machining. The weaker curved cutting tips on the transverse sides of the cutting tip have not only a larger radius of curvature in contrast to the angular sided radius cutting tips but they can also be arranged considerably longer then the radius cutting edges. Thereby, when the weaker curved cutting tips are used a much higher chip removal is achieved then by using the strongly curved radius cutting edges.

With known cutting tips the stronger convex curve gradually merges into the weaker convex curve of the cutting edges by the cutting side's transverse sides and becomes larger extending from the respective radius cutting edges while the curved radius remains constant. Therefore, a defined borderline of the radius cutting edges in contrast to the weaker curved cutting edges on the weaker curved cutting edges on the cutting edges transverse sides does not exist.

SUMMARY

The invention pertains to a cutting tip for a milling cutter for automatic milling with the basic shape of a parallelogram along whose longitudinal sides straight cutting edges are formed. Thereto radius cutting edges are attached which are located on the parallelogram edges with the smaller corner angles. In addition, there are cutting tips (3) which are arranged on the parallelogram transverse sides with a convex curve. At least one the convex curve's radius is slightly greater than the radius of curvature of the cutting edges.

Therefore, the invention's basic task is to create different types of cutting edges by which the weaker curved cutting edges are deposited on the transverse sides of the angular sided radius cutting edges with stronger curves and require a clearly distinguishable slope of the cutting tips by the curved cutting edges.

According to the invention this task will be solved as follows. There will be an edging range with a concave curve between the radius cutting edges and the convex curved cutting edges whereby in each case according to the slope either the radius cutting edge or the convex curved cutting edge reaches the respective transverse side in the work piece gear.

It is essential for the invention, that the concave curved area between the radius cutting tips and the additional weaker curved blades on the cutting tips' transverse sides only accepts the work piece gear with the radius cutting edge or only the weaker curved additional cutting edge on the respective transverse side. Thereby it is easier to avoid incorrect processing.

It is important to note that the present invention is not intended to be limited to a system or method which must satisfy one or more of any stated or implied objects or features of the invention. It is also important to note that the present invention is not limited to the preferred, exemplary, or primary embodiment(s) described herein.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
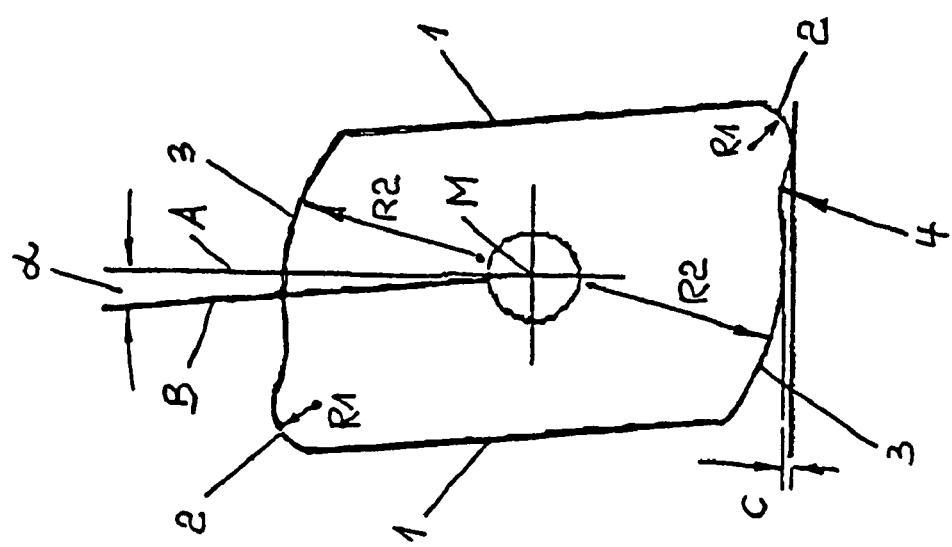
FIG. 1 is a view of a cutting tip based on the invention in the inclined position for a facing operation with one of the angular radius cutting edges.

In the FIGS. 1 and 2, the outline of the cutting tip which essentially corresponds to that of a parallelogram can be recognized if one zeros in on the design of the curved transverse sides which subsequently will be described in more detail. Thus the cutting tip has longitudinal edges parallel to each other which have been constructed as cutting edges 1. Therefore, milling work can also be done in the vertical position of the cutting tip. In this position illustrated in the graph the lengthwise centerline B of the cutting tip concurs with the rotation axle A of the milling cutter.

Corresponding to the basic form of the parallelogram the cutting tip has edges with a corner angle larger then 90 degrees and edges with a corner angle smaller then 90 degrees. On the corners of the smaller corner angles, the cutting tip shows radius cutting tips 2, which have a relatively strong curve. The curve radius R1 is respectively small. The radius cutting tips illustrate the continuation of the lengthwise cutting tips 1 and they are circularly formed around the respective corner of the cutting tip.

On the shorter transverse side of the cutting tip the side with a parallelogram provided, the radius cutting edges 2 which are outward convexly curved turn into a concave curved edge area 4, illustrate a respective negative curve radius. A weaker curved cutting edge 3 is attached to this curvature range by the cutting edges transverse sides. This cutting edge which in the case of a circular curvature shows a singular curvature radius R2 which is substantially larger then the curvature radius R1 of the radius cutting edges 2.

Different milling work is performed with the radius cutting edges 2 and the transverse side cutting edges 3 each of which require slopes different from one other. If the work is performed with one of the radius cutting edges 2, the cutting tip will be tilted around a lesser angle α, which is specified in FIG. 1. The angle α arises between the rotation axle A of the milling cutter and the longitudinal center line B of the cutting tip. If the milling is done with one of the transverse sided cutting tips, the slope of the cutting tip opposite of the milling cutter axle must be enlarged The result of this is the angle β between the milling cutter axle A and the longitudinal center line B of the cutting edge as it is demonstrated in FIG. 2.

In a practical embodiment a cutting tip of the related type has a length of about 12 mm and a width of approximately 7 mm. The curvature radius R1 of the radius cutting edges 2 is 1 mm and the curvature radius R2 of the transverse sided cutting edges is about 6 mm and is therefore also six times larger then the curvature radius R1. The length of the transverse sided cutting edges 3 extends over approximately three fourth of the transverse length of the cutting tip and attaches to the radius cutting edges 2 of the negative curvature area with a curvature radius of about 2 mm. The result of such a geometry of the cutting tip is that by an inclination angle a (FIG. 1) of 5 degrees during the milling process a space of about 0,2 mm develops by the to be processed work piece surface and therefore there exists underneath the not applied transverse sided cutting edge 3 a sufficient free space. In contrast by an inclination angle β (FIG. 2) of the cutting tip there is a space D of 0,33 mm between the bottom vertex of the radius cutting edge 2 and the work piece surface to be processed. In this case a sufficient free space has been created below the radius cutting edge 2.

Figure 2:
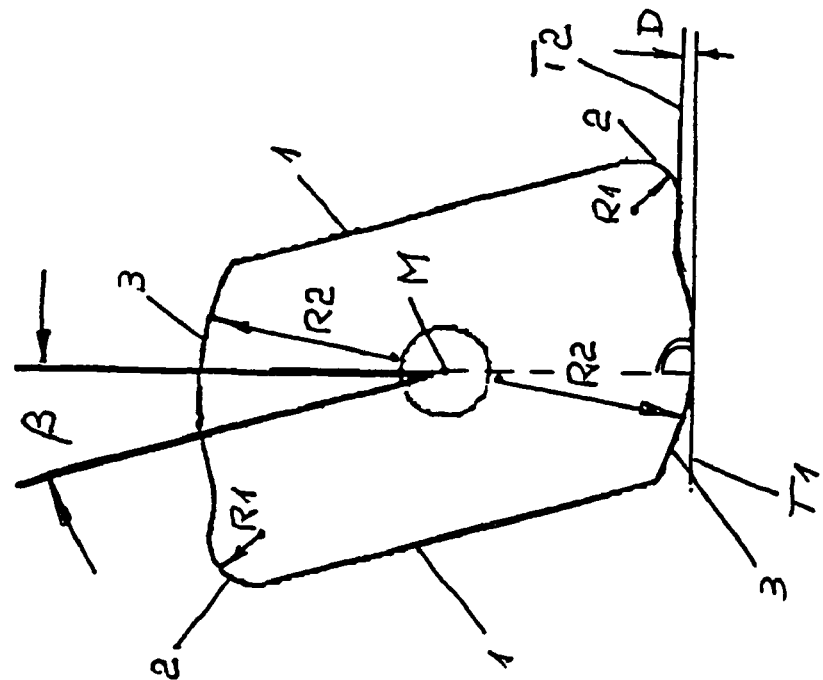
FIG. 2 is a view of the cutting tip in the second slope for milling work with one of the cutting edges on the disk transverse sides.

Basically the preceding described spaces C and D of the inclination angle β of the cutting tip are created because tangents T1 and T2 as illustrated in FIG. 2. The tangent T2 is closer to the center M of the cutting edge then tangent T1. It is important for this definition that the tangent T1 is attached to the weak curved transverse sided cutting edge so that one of the plumb lines goes to the tangent T1 through the center M of the cutting edge. Subsequently the dedendum angle of these plumb line to the tangent T1 is 90 degrees. Furthermore, it is important for this definition that the tangent T2 on the radius cutting edge is the one which runs parallel to the tangent T1.

Modifications and substitutions by one of ordinary skill in the art are considered to be within the scope of the present invention, which is not to be limited except by the allowed claims and any legal equivalents thereof.

The invention claimed is:

1. A cutting tip for a cutting mill for automatic milling work with the basic form of a parallelogram along whose longitudinal sides straight cutting edges (1) are formed with at least one pair of cutting tips (2,3) which are arranged on at least one of the parallelogram transverse sides with a convex curve attached to them wherein at least one the convex curve's radius is much greater than the radius of curvature of the radius' cutting edges (2), characterized in that between the radius cutting edge (2) and the convex curved cutting edge (3) is an edge area (4) having a concave curvature such that based upon the angle of the cutting tip, either the radius cutting edge (2) or the convex curved cutting edge (3) comes in contact with a work piece to be milled and further wherein when the convex curved cutting edge is in a cutting position, a first distance between a center (M) of the parallelogram and a first tangent line (T1) tangent to the convex curved cutting edge is greater than a second distance between the center (M) and a second tangent line (T2) tangent to the radius cutting tip and parallel to the first tangent line (T1).

2. A cutting tip according to claim 1, wherein the convex curved cutting tip (3) joins the radius cutting edge 2 along a generally constant concave curved area 4.

3. A cutting tip according to claim 1, wherein the convex curved cutting tip (3) has a radius greater than a radius of the radius cutting edge 2.

* * * * *